United States Patent Office 3,574,595
Patented Apr. 13, 1971

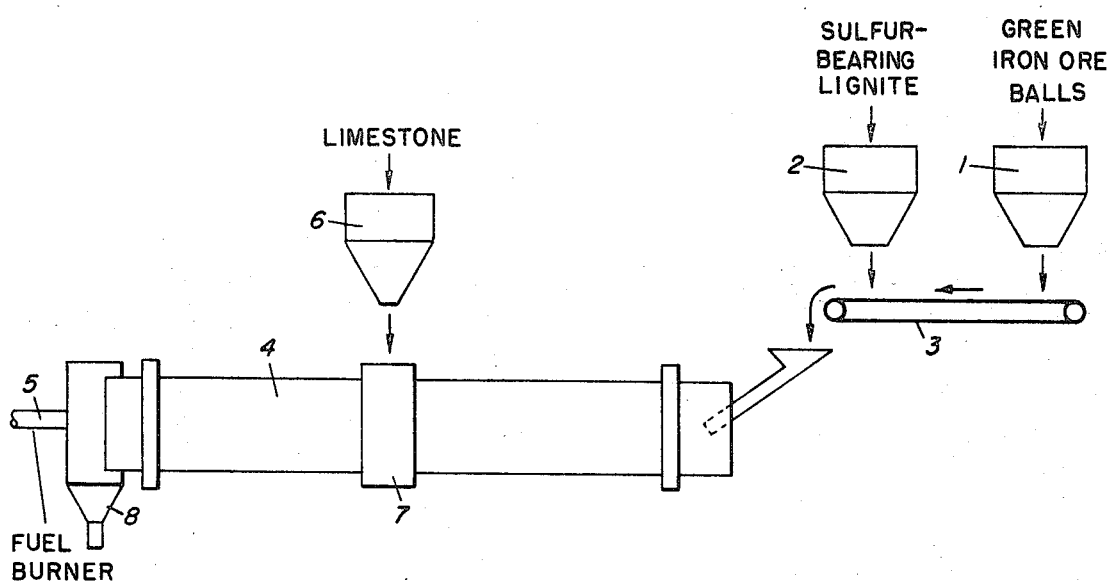

3,574,595
METHOD FOR PRODUCING PREREDUCED IRON ORE PELLETS
Morris M. Fine and Robert B. Schluter, Minneapolis, Minn., assignors to the United States of America as represented by the Secretary of the Interior
Filed Jan. 6, 1969, Ser. No. 789,222
Int. Cl. C21b 1/10
U.S. Cl. 75—5                                                        10 Claims

ABSTRACT OF THE DISCLOSURE

Green pellets composed of (1) finely ground iron ore or concentrate and (2) a binder such as bentonite clay are heated to a temperature of about 1740° F.–2100° F., preferably 1830° F., under strongly reducing conditions, in the presence of a reductant and sulfur, so that the pellets are partially reduced and sulfurized to the extent that they contain at least bout 0.08 weight percent sulfur. Substantial sintering of metallic iron in the pellets thereby occurs. Subsequently, these hot prereduced pellets can be desulfurized with $CaCO_3$.

---

This invention relates to the production of pelletized iron ore.

Prereduced iron ore pellets are a new and potentially superior raw material for the iron blast furnace. Such pellets desirably should contain a high percentage of metallic iron and possess a substantial crushing strength able to withstand the rigors of handling and transportation to the blast furnace. There are a number of processes which have heretofore been employed to make such pellets from iron ore and concentrates. One of these processes involves admixing finely ground moist iron ore or concentrate with a bentonite clay binder and fine coal, rolling the mixture in small balls (about ½-inch diameter), and then hardening and partially reducing the metal in the balls by heating to a high temperature (about 2450° F.). In a second variation, the fine coal is excluded from the pellet mix, and the green balls are dried and hardened by heating to about 2450° F., after which the hardened pellet is reduced by reheating in another furnace to which solid reductant such as lignite or anthracite is also introduced. In a third scheme, the green balls composed of moist concentrate or ore and bentonite are fed into a furnace along with solid reductant such as lignite or anthracite and heated to about 2100° F. to effect simultaneous induration and reduction. In both the second and third processes small percentages of limestone or dolomite are introduced into the heating vessel with the coal to prevent sulfur impurities in the coal from entering the reduced pellets.

All these prior art procedures operate at fairly high temperatures, and such high temperatures cause the coal ash and other constituents of the charge to soften, become plastic and stick to the kiln walls to thereby form undesirable rings and accretions within the kiln. Furthermore, high temperatures contribute to high operating costs. A still further disadvantage is that these processes are limited to the use of a low sulfur coal so as to preserve the quality of the final product.

We have now developed a pelletizing process for operating at substantially lower temperatures. Generally, the process comprises mixing finely ground iron ore or concentrate with a small amount of binder, and rolling the mixture into pellet-shaped agglomerates. As used throughout the specification and claims, the term binder means organic or inorganic temporary binders such as lignin liquor, natural gums, dextrin, sodium silicate, bentonite and other highly adhesive clays. The green balls or pellets are then heated to a temperature of about 1740°–2100° F., preferably about 1830° F., in a strongly reducing environment, in the presence of sulfur and a reductant, and maintained at this temperature for a period of time sufficient to achieve partial reduction of the iron and to permit a small percentage of the sulfur to enter the pellets. The sulfur should comprise at least about 0.08 weight percent of the ball, preferably at least about 0.12%; and at least about 50% of the iron in the pellet should be converted to metallic iron.

At a temperature of about 1740° F. or more the sulfur combines with elemental iron in the ball or pellet to form iron sulfide, a substantial amount of which is present as a liquid. At a temperature of 1810° F. or more, all the iron sulfide is present as a liquid. This liquid creates an environment or transport medium in which iron particles and atoms can more readily move and contact one another, and thereby sinter together. In the absence of such a liquid sulfide phase, it is necessary for the iron to be transported via solid state diffusion, which does not attain a practical rate until temperatures approach 2010° F.

Since the majority of the iron sulfide is formed near the surface of the pellet, it is in this region that sintering takes place, resulting in a pellet surface layer that in cross section is more consolidated than the interior of the pellet.

Once the iron has sintered sufficiently, the pellet is desulfurized and further reduced so as to enable the product to meet iron and steelmaking specifications, and to effect an overall reduction to metallic iron of at least about 75% of the iron present, preferably more than about 90% conversion. This is accomplished by admixing $CaCO_3$ (e.g., crushed limestone or dolomite) with the hot sulfurized pellets, and continuing the heating under strongly reducing conditions.

It is therefore an object of the present invention to produce prereduced iron ore pellets at substantially lower heating temperatures.

A further object is to produce such pellets in the presence of sulfur.

A still further object is to produce such pellets in the presence of high sulfur coals.

Other objects and advantages will be obvious from the following more detailed description of the invention taken in conjunction with the drawings in which:

The figure shows an apparatus which can be employed for the process of the present invention.

In the practice of the invention, finely ground high grade iron ore, e.g. of the direct-shipping category, or a concentrate resulting from such beneficiation processes as gravity concentration, flotation, magnetic separation, etc., is first obtained. These materials will normally analyze from about 55 to 68 percent Fe, contain 50 percent or more minus 325 mesh particles, and have a surface area of about 1700–2300 square centimeters per gram. The ore or concentrate is then admixed with about 0.5 to 1.5 weight percent (dry iron ore basis) of binder such as bentonite clay. On this same basis the moisture content of the mix preferably ranges from about 7–12% $H_2O$. The mix is then pelletized into roughly spherical balls of approximately ¼- to ¾-inch diameter in, for example, a drum, disk or cone pelletizer.

After being formed, the green pellets are then heated to about 1740°–2100° F., preferably about 1830° F., in a strongly reducing atmosphere (e.g. gas produced by the burning of fuel), in the presence of sulfur and a gaseous (e.g., carbon monoxide) or solid reductant. If a sulfur-containing solid reductant such as lignite, bituminous, or anthracite coal is employed, there may be enough sulfur present therein for the purpose of the invention. If not, the sulfur can be added as, for example, elemental sulfur, pyrite or pyrrhotite, or it can be added to the reactor atmosphere as $SO_2$, $S_2$, $H_2S$ or other sulfur bearing gases.

The preferred reductant is lignite or lignite char containing about 0.5–3.0% sulfur preferably of the pyritic variety (organic sulfur in the coal performs the required function less efficiently). Such a material is very effective if mixed with the pellets in an amount equal to 25–100 weight percent of the pellets.

Once the desired heating temperature is reached, it is maintained for a period of time sufficient to partially reduce and sulfurize the pellets to the extent that each pellet contains at least about 0.08 percent sulfur, preferably at least about 0.12 percent, and to the extent that at least about 50% of the iron in the pellet is converted to metallic iron. This usually requires from 0 to 30 minutes.

Following partial reduction and sulfurization, the hot pellets at a temperature of about 1740°–2100° F. are contacted with limestone or dolomite in a strongly reducing environment to desulfurize the balls to required levels (e.g., 0.05 weight percent sulfur or less), and to effect an overall reduction to metallic iron of at least about 75% of the iron content, preferably more than about 90% conversion. The amount of limestone or dolomite employed and the contacting time depend, of course, on the amount of sulfur in the pellet. Balls ¼- to ¾-inch diameter) containing about 0.08–0.75 sulfur can be adequately desulfurized with 2–6 weight percent limestone or dolomite (−10 mesh) in about 30–60 minutes at 1830° F.

Thereafter the pellets are cooled in the absence of air and separated from other reactants such as partially combusted reductant by standard procedures of screening and magnetic separation.

Referring now to the drawings, the process of the present invention can be practiced by feeding green iron ore balls in hopper 1 and sulfur-bearing lignite in hopper 2 onto conveyor feeder 3 which discharges into a rotary kiln 4. Gas, solid fuels or liquid petroleum products are burned in burner 5 to supply hot gases to the kiln. To desulfurize the pellets, dolomite or limestone in hopper 6 is fed into the kiln 4 through side feeder 7 at a point where the pellets have been partially reduced and sufficiently sulfurized. The kiln contents are removed at a discharge device 8, and then cooled in the absence of air, after which the pellets are separated from partially combusted lignite.

The following examples illustrate the effectiveness of the process of the present invention.

EXAMPLE 1

A stock of ½-inch green (moist) balls was prepared by binding a Minnesota taconite concentrate (consisting largely of magnetite and analyzing 64.5 percent Fe and 8.1 percent silica) with bentonite clay (0.5–1.5 weight percent dry basis). These were dried at 230° F., and 500 grams of pellets plus 200 grams of lignite char were charged to a slowly rotating steel drum. This vessel was inserted into a muffle furnace at 840° F., and heated (in 85 minutes) to 1830° F. The contents were sampled for sulfur analysis after which dolomite (54% $CaCO_3$, 44% $MgCO_3$) or limestone (96% $CaCO_3$) at a particle size of 10–28 mesh was charged into the drum in an amount of 8 grams. Heating continued for an additional 30 minutes at 1830° F. The final desulfurized pellets were analyzed for total iron, iron metal and sulfur, and tested for crushing strength. These tests were repeated while employing several lignite chars with the taconite, and the results are shown in the following table.

TABLE 1

| Test No. | S analysis of reductant, Percent | Pellet properties ||||| 
|---|---|---|---|---|---|---|
| | | Crushing strength, lbs. | Percent Fe | Percent metallic Fe | Percent S prior to desulfurizing | Percent S after desulfurizing |
| 1 | 0.5 | 140 | 84.5 | 78.0 | 0.02 | 0.02 |
| 2 | 1.0 | 150 | 85.3 | 78.4 | 0.04 | 0.03 |
| 3 | 1.2 | 165 | 84.7 | 77.6 | 0.05 | 0.04 |
| 4 | 1.5 | 235 | 84.4 | 79.6 | 0.08 | 0.05 |
| 5 | 1.6 | 205 | 84.9 | 81.0 | 0.15 | 0.03 |
| 6 | 1.8 | 200 | 85.2 | 81.7 | 0.62 | 0.09 |

[1] Blend of lignite chars.

Table 1 shows that all the pellet products were well reduced, but only the reductants fairly high in sulfur yielded strong pellets (more than 200-lb. crushing load per pellet. With reductants low in sulfur, additional tests showed that heating to about 2060° F. would have been required to yield pellets with crushing strengths over 200 pounds. It is also shown in Table 1 that much of the sulfur absorbed in the sulfurization step was effectively removed during desulfurization.

EXAMPLE 2

The procedure was the same as Example 1 except that lignite char was fortified with pyrite (42.6% Fe, 49.5% S) to increase the sulfur content. The test results are shown in the following table.

TABLE 2

| Test No. | S analysis of reductant, Percent [1] | Pellet properties ||||| 
|---|---|---|---|---|---|---|
| | | Crushing strength, lbs. | Percent Fe | Percent metallic Fe | Percent S prior to desulfurizing | Percent S after desulfurizing |
| 7 | 1.7 | 255 | 84.7 | 78.1 | 0.07 | 0.02 |
| 8 | 2.9 | 250 | 85.8 | 82.0 | 0.16 | 0.04 |
| 9 | 2.9 | 250 | 84.4 | 78.8 | 0.12 | 0.08 |

Again, from Table 2 it can be seen that well metallized pellets with good crushing strength are produced and that most of the sulfur is removed from the product.

EXAMPLE 3

In order to show the workability of the invention on a larger scale, tests were conducted in a 1-ft. x 15-ft. rotary kiln heated internally by a natural gas burner so that the maximum temperature was about 1830° F. Raw materials were green (moist) balls prepared from the same magnetic concentrate described earlier, and crude lignite. Feed rates were 30–40 pounds per hour of green balls and 25–30 pounds of lignite. Total heating time was 1.5 to 2.0 hours. At the end of the heating period the pellets were analyzed for total iron, iron metal, and sulfur, and were tested for crushing strength. The test results are shown in the following table.

TABLE 3

| Test No. | S analysis of reductant, percent | Pellet properties | | | |
|---|---|---|---|---|---|
| | | Crushing strength, lbs. | Percent Fe | Metallic Fe, percent | Percent S |
| 10 | [1] 0.3 | 135 | 83.7 | 63.0 | 0.02 |
| 11 | [2] 1.4 | 280 | 80.0 | 63.7 | 0.12 |
| 12 [3] | 0.3 | 300 | 82.8 | 72.9 | 0.02 |

[1] Low sulfur lignite.
[2] High sulfur lignite.
[3] The pellets made in test No. 11 were reintroduced into the kiln with low sulfur lignite plus 3% limestone (based on pellet weight).

As can be seen from Table 3, the use of low sulfur lignite (test No. 10) resulted in a product having a low physical strength, although the pellets were fairly well metallized. The use of high-sulfur lignite (test 11) resulted in sharply increased crushing strength but caused a high sulfur content in the product. However, this sulfur can be readily removed without any loss of crushing strength as shown in test No. 12.

The present invention makes it possible to operate at least 200° F. lower than the prior art thus economizing on fuel and improving kiln operation. Further, lower rank (high sulfur) fuels can be employed thus saving some raw material costs and conserving natural resources.

While the process herein described is well adapted to carry out the objects of the present invention, it is understood that various modifications and changes may be made all coming within scope of the following claims.

What is claimed is:

1. A process for producing prereduced iron ore pellets comprising:
   (a) heating green pellets composed of a binder and finally ground iron ore or concentrates to a temperature of about 1740°–2100° F. under strongly reducing conditions in the presence of a reductant and sulfur, said binder selected from the group consisting of lignin liquor, natural gums, dextrin, sodium silicate and bentonite;
   (b) maintaining said temperature for a period of time sufficient to partially reduce and sulfurize said green pellets to the extent that at least about 50% of the iron therein is converted to metallic iron to thereby produce partially reduced pellets, and to the extent that said partially reduced pellets contain at least about 0.08 weight percent sulfur; and then
   (c) desulfurizing and further reducing said partially reduced pellets by contacting said partially reduced pellets with a sulfide acceptor in a strongly reducing environment while said pellets are at a temperature of about 1740°–2100° F. to thereby produce said prereduced iron ore pellets, the iron content of which is at least 75% metallic iron.

2. The process of claim 1 wherein said green pellets are sulfurized to the extent that said agglomerates contain at least about 0.12 weight percent sulfur.

3. The process of claim 2 wherein said heating temperature is about 1830° F.

4. The process of claim 3 wherein said reductant is lignite or lignite char.

5. The process of claim 4 wherein said sulfur is supplied by said lignite or lignite char.

6. The process of claim 2 wherein said sulfur in step (a) of claim 1 is supplied from material other than said reductant.

7. The process of claim 1 wherein said heating temperature is about 1830° F.

8. The process of claim 7 wherein said reductant is lignite or lignite char.

9. The process of claim 8 wherein said sulfur is supplied by said lignite or lignite char.

10. The process of claim 1 wherein said sulfur in step (a) of claim 1 is supplied from a material other than said reductant.

References Cited

UNITED STATES PATENTS

| 2,394,793 | 2/1946 | Maier | 75—3 |
| 3,295,957 | 1/1967 | Robertson | 75—3X |

ALLEN B. CURTIS, Primary Examiner